United States Patent [19]
Pietsch et al.

[11] Patent Number: 5,358,115
[45] Date of Patent: Oct. 25, 1994

[54] DARK BOX FOR STORAGE OF EXPOSED LIGHT SENSITIVE SHEETS

[75] Inventors: Gerald Pietsch, Kaufbeuren; Helmut Schausberger, München, both of Fed. Rep. of Germany

[73] Assignee: Agfa-Gevaert Aktiengesellschaft, Leverkusen, Fed. Rep. of Germany

[21] Appl. No.: 149,022

[22] Filed: Nov. 8, 1993

Related U.S. Application Data

[63] Continuation of Ser. No. 926,922, Aug. 7, 1992.

[30] Foreign Application Priority Data

Sep. 13, 1991 [DE] Fed. Rep. of Germany ....... 4130562

[51] Int. Cl.$^5$ ............................................. B65D 85/48
[52] U.S. Cl. ................................... 206/455; 206/449; 206/425
[58] Field of Search ............... 206/425, 449, 455, 555, 206/556, 561; 354/277, 281, 284

[56] References Cited

U.S. PATENT DOCUMENTS

| | | | |
|---|---|---|---|
| 282,939 | 8/1883 | Wheeler | 206/455 |
| 909,459 | 1/1909 | Schmuck | 354/284 |
| 2,811,251 | 10/1957 | Yerkovich | 206/455 |
| 3,955,092 | 5/1976 | Hubert | 206/455 |
| 4,049,142 | 9/1977 | Azzaroni | 214/301 |
| 4,164,309 | 8/1979 | Staats | 206/425 |
| 4,349,189 | 9/1982 | Edström. | |
| 4,479,684 | 10/1984 | Doyel | 206/425 |
| 4,509,736 | 4/1985 | Stahl. | |
| 4,591,140 | 5/1986 | Illig | 271/11 |
| 4,652,742 | 3/1987 | Wauer et al. . | |
| 4,697,902 | 10/1987 | Maehara et al. | 206/455 |
| 4,727,391 | 2/1988 | Tajima et al. | 354/277 |
| 4,759,679 | 7/1988 | Müller | 414/416 |
| 4,828,106 | 5/1989 | Akao et al. | 206/455 |
| 4,889,233 | 12/1989 | Torii | 206/455 |
| 5,042,662 | 8/1991 | Mirlieb et al. . | |
| 5,078,271 | 1/1992 | Bauer | 206/455 |
| 5,172,905 | 12/1992 | Vanous et al. | 354/281 |

FOREIGN PATENT DOCUMENTS

| | | |
|---|---|---|
| 2349587 | 10/1973 | Fed. Rep. of Germany . |
| 3615245C1 | 5/1986 | Fed. Rep. of Germany . |
| 3911376A1 | 4/1989 | Fed. Rep. of Germany . |

*Primary Examiner*—David T. Fidei
*Attorney, Agent, or Firm*—Darby & Darby

[57] ABSTRACT

A dark box which has at least one sealable opening and whose internal chamber can be divided into a desired number of compartments for stacks of identical or differently dimensioned and/or shaped sheets of exposed radiation sensitive material such as X-ray films, photographic paper, photographic film or others. The dark box can be inserted into the dark room of an apparatus which is designed to simultaneously withdraw two or more sheets from the inserted dark box and to transport the withdrawn sheets toward or into a developing machine of the type capable of simultaneously processing two or more rows of sheets. If the machine must be confined in a dark chamber, the apparatus is equipped or combined with an adapter which prepares simultaneously withdrawn sheets for admission into the developing machine.

11 Claims, 6 Drawing Sheets

DARK BOX FOR STORAGE OF EXPOSED LIGHT SENSITIVE SHEETS

CROSS-REFERENCE TO RELATED CASE

This is a continuation of application Ser. No. 07,926,922, filed Aug. 7, 1992.

The dark box and the apparatus of the present invention are identical with those described and shown in the commonly owned copending patent application Ser. No. 07,926,919 filed Aug. 7, 1992 by Pietsch and Leithenmaic for "Method of transferring discrete light sensitive sheets from a dark box".

BACKGROUND OF THE INVENTION

The invention relates to improvements in so-called dark boxes, namely to improvements in receptacles or containers from which light or certain other radiation (hereinafter referred to as light) is wholly excluded and which are used to store radiation sensitive photographic and analogous equipment, for example, films, plates and/or paper (hereinafter called light sensitive sheets). Such dark boxes are also called cassettes or magazines.

X-ray equipment is used in many fields including medicine as well as various industries, particularly for nondestructive testing of materials and/or products. Such equipment employs sheets which carry coatings of photosensitive material. When the exposure of a sheet to a required amount of radiation is completed, the thus obtained latent image must be developed in a suitable developing machine. To this end, the exposed but undeveloped sheets are inserted into a dark box within the confines of a darkroom and the dark box is closed and sealed when it receives a desired (e.g., maximum) number of exposed sheets so that the thus closed and sealed dark box can he transported to a developing machine. A dark box which is ready to be relieved of its contents is coupled with a so-called feeder which withdraws discrete sheets, one after the other, and introduces them into the developing machine.

A drawback of presently known dark boxes is that each such receptacle or container is designed to accept exposed sheets of a particular size and shape. Thus, it is necessary to maintain a supply of dark boxes each of which can he used to store exposed sheets of a given size and shape. This contributes to the cost and to space requirements of the equipment, irrespective of whether the sheets are used to receive latent images of parts of human or animal bodies or latent images of inanimate objects in a manufacturing plant or the like. Dark boxes of different sizes are provided with discrete codes which are read by the feeder in order to avoid introduction of sheets into wrong developing machines. In spite of the provision of coded dark boxes, the feeder is likely to make mistakes and to introduce exposed but undeveloped light sensitive sheets into wrong developing machines. Each such error must be corrected (if possible) in a dark room with attendant loses in time, or the sheet which was withdrawn from a dark box is likely to be exposed to light on its way to the developing machine with attendant damage to or total eradication of the latent image. On the other hand, it is normally desirable to rapidly develop the latent images, e.g., in a hospital or in a similar establishment so that the physician or another person in charge can receive an exposed latent image as expeditiously as possible. The same holds true for nondestructive testing of objects in various plants, especially if the results of testing are utilized to modify the operation of various machines in response to detection of unsatisfactory objects.

OBJECTS OF THE INVENTION

An object of the invention is to provide a novel and improved dark box which is more versatile than heretofore known dark boxes.

Another object of the invention is to provide a dark box which can simultaneously receive and confine a plurality of differently shaped and/or dimensioned exposed but undeveloped light sensitive sheets.

A further object of the invention is to provide a dark box which can be utilized as a superior substitute for two or more heretofore known dark boxes.

An additional object of the invention is to provide the above outlined dark box with means for converting it for reception of differently sized and/or shaped exposed light sensitive sheets.

Still another object of the invention is to provide a novel and improved method of storing differently sized and/or shaped exposed light sensitive sheets in a small area and without risking transfer to wrong developing machines.

A further object of the invention is to provide a novel and improved apparatus for transferring exposed but yet to be developed light sensitive sheets from one or more dark boxes of the above outlined character into one or more developing machines.

An additional object of the invention is to provide an apparatus which can transfer exposed but undeveloped light sensitive sheets to a single developing machine or to a plurality of different developing machines.

Another object of the invention is to provide an apparatus which can rapidly evacuate the contents of a dark box serving for temporary storage of a large number of two or more different formats of exposed but undeveloped light sensitive sheets.

Still another object of the invention is to provide the apparatus with novel and improved means for monitoring the transfer of sheets from a selected dark box into one or more developing machines.

A further object of the invention is to provide the apparatus with novel and improved means for arraying sheets or various formats between the dark box and the developing machine or machines.

Another object of the invention is to provide a novel method of and means for preventing vapors and/or other flowable substances which are used or which are generated in a developing machine from adversely influencing the exposed but undeveloped sheets prior to admission into the developing machine.

An additional object of the invention is to provide a novel and improved combination of one or more developing machines with a darkroom for confinement of dark boxes of the above outlined character.

SUMMARY OF THE INVENTION

One feature of the invention resides in the provision of a novel and improved dark box for storage of light sensitive sheets of different formats, such as exposed but undeveloped photographic films, X-ray films, photographic paper and the like. The improved dark box comprises a housing which defines an internal chamber and has at least one opening for insertion and/or withdrawal of sheets, means for sealing and exposing the at least one opening, and adjustable means for dividing the chamber into a plurality of variable-capacity compartments for sheets of different formats. Each variable-capacity compartment can have a depth which is sufficient to accommodate a stack of superimposed sheets.

The compartments preferably include at least two compartments which are adjacent (preferably immediately adjacent) each other.

The housing can be provided with at least one recess, and the dividing means can include at least one partition having a portion which is insertable into and withdrawable from the at least one recess. Such housing can include a first section (e.g., a bottom or lower section) and a second section (e.g., an upper section or cover) which is movable relative to the first section between an open and a closed position. The at least one recess is provided in one of these sections. Such one section has an inner side and an outer side, and the housing can comprise at least two recesses which constitute substantially parallel elongated grooves in the inner side of the one section. The dividing means can further comprise at least one wall which is movable in the chamber substantially longitudinally of the grooves, and means for releasably securing the at least one wall to the housing in a selected position (as seen longitudinally of the grooves). In other words, the adjustable dividing means can comprise at least one transferrable and removable partition and at least one mobile wall in the chamber as well as means for releasably securing the at least one wall to the housing in any one of a plurality of different positions in each of which the capacity of at least one of the plural compartments assumes a different value.

In accordance with a presently preferred embodiment, the housing comprises a first section, a second section and means for pivotally coupling the second section to the first section. The at least one opening can be provided in the pivotable second section and the sealing-exposing means is then provided on or in and is movable relative to the second section. Such sealing-exposing means can include a substantially panel-like member which is slidable relative to the second section and relative to the opening in the second section and is smaller than the second section.

The inner sides of both sections of the housing can be provided with elongated grooves which are aligned with each other, at least when the second section is moved to the closed position so that the inner sides of the two sections confront each other. The partition or partitions of the dividing means have portions which extend into the aligned grooves so that such partitions separate neighboring compartments of the internal chamber from each other.

Another feature of the invention resides in the provision of an apparatus for transferring, into at least one developing machine, exposed light sensitive sheets which are confined in plural compartments of a dark box having at least one sealable opening to afford access to the compartments. The improved apparatus comprises means for simultaneously withdrawing exposed light sensitive sheets from at least two compartments of the dark box, and means for conveying simultaneously withdrawn exposed light sensitive sheets toward the at least one developing machine.

If the dark box is of the aforedescribed character, i.e., if it comprises a housing with a first section and a second section which latter is movable between a closed position in which the at least one opening is sealed and an open position in which the at least one opening affords access to sheets in variable-capacity compartments of the housing, the apparatus preferably further comprises a light-tight enclosure or outer housing which can receive the dark box and which comprises or accommodates means for moving the second section of the housing to the open position upon insertion of the dark box into the enclosure.

The apparatus preferably further comprises means for monitoring the withdrawal of sheets from the respective compartments. If the withdrawing means comprises at least one suction cup, the monitoring means can include means for monitoring the pressure at the at least one suction cup.

As a rule, each compartment will have or can have a depth which is sufficient to accommodate a stack of superimposed sheets, and the monitoring means of an apparatus for transferring sheets from such dark box can include means for monitoring the numbers of sheets which are withdrawn from individual compartments during simultaneous withdrawal of sheets from the at least two compartments.

The conveying means of the improved apparatus defines at least one path for advancement of withdrawn sheets toward the at least one developing machine, and the means for monitoring the number of sheets can comprise first and second rollers or other suitable rotary members which are disposed at opposite sides of the at least one path and define a nip for sheets which advance along the at least one path. One of the rotary members is movable relative to the other rotary member by the sheets which advance along the at least one path so that the position of the one rotary member relative to the other rotary member is a function of the number of overlapping sheets in the nip of the first and second rotary members. Such monitoring means further comprises means for tracking the position of the one rotary member. Such tracking means can comprise a lever which is pivotable between a plurality of different positions in response to movement of the one rotary member relative to the other rotary member, and means for photoelectronically scanning the position of the lever. The lever can comprise a shorter arm which is movable by the one rotary member and a longer arm which cooperates with the photoelectronic scanning means.

The aforementioned enclosure for the dark box is provided with at least one outlet for introduction of withdrawn sheets from the internal space of the enclosure into the at least one developing machine, and with means for maintaining the internal space of the enclosure at a superatmospheric pressure in order to prevent penetration of vapors and/or other fluids from the at least one developing machine into the enclosure and hence into contact with exposed but undeveloped sheets in the enclosure or in the dark box.

The apparatus can further comprise adapter means for manipulating simultaneously withdrawn sheets prior to introduction of sheets into the at least one developing machine. This is of advantage when the apparatus is used to transfer sheets into a developing machine which must be confined in a dark chamber.

The novel features which are considered as characteristic of the invention are set forth in particular in the appended claims. The improved dark box itself, however, both as to its construction and the mode of using the same, together with additional features and advantages thereof and of the apparatus for transferring sheets therefrom, will be best understood upon perusal of the following detailed description of certain presently preferred specific embodiments with reference to the accompanying drawing.

BRIEF DESCRIPTION OF THE DRAWING

FIG. 3c is an enlarged perspective view of a detail in FIG. 3a;

DESCRIPTION OF PREFERRED EMBODIMENTS

Figure 1:
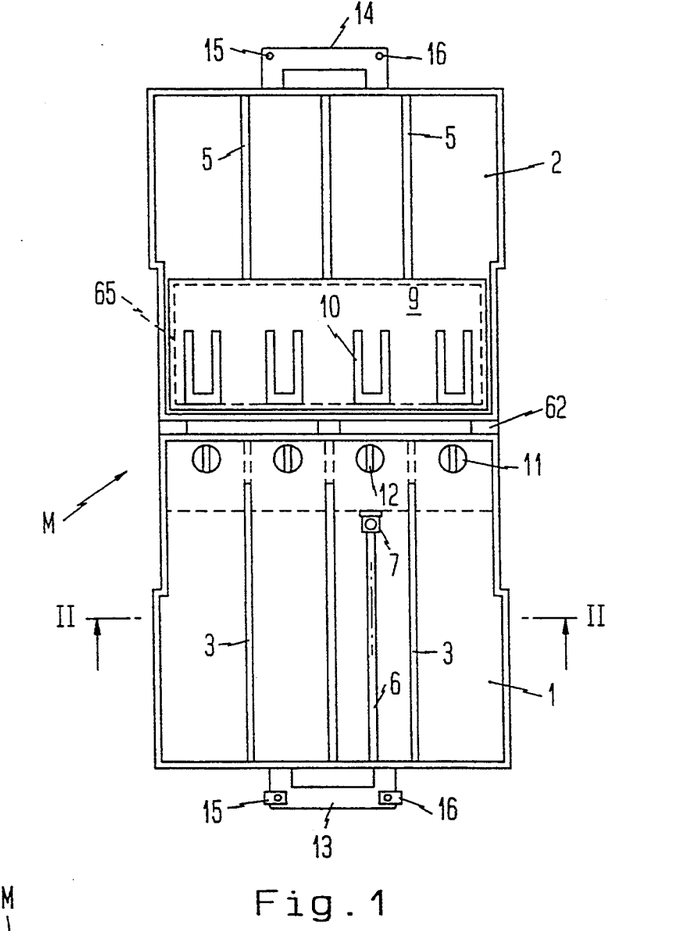
FIG. 1 is a schematic plan view of a dark box for temporary storage of one or more stacks of flexible light sensitive sheets, one section of the housing of the dark box being shown in the open position.
Figure 2:
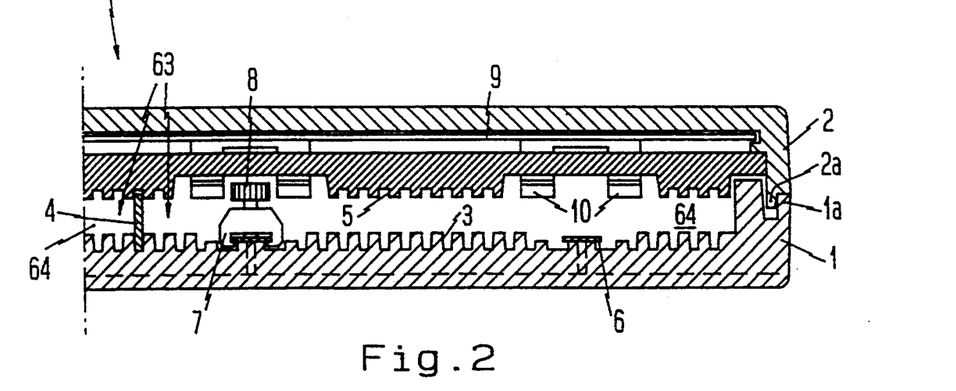
FIG. 2 is an enlarged fragmentary transverse sectional view of the dark box, with another section of the housing shown in the closed position.

Referring first to FIGS. 1 and 2, there is shown a dark box M in the form of a relatively flat and substantially square or rectangular cassette or magazine for storage of piles or stacks 61 of sheets 60, 60a . . . (FIGS. 3a and 3b) of exposed but yet to be developed light sensitive material. The dark box M comprises a housing including a first or bottom section 1, a second or top section 2, and means (e.g., a hinge 62) for pivotally coupling the second section 2 to the first section 1 so that the section 2 is movable between an open position shown in FIG. 1 and a closed position which is shown in FIG. 2.

The inner side of the first section 1 is formed with a plurality of recesses in the form of elongated at least substantially parallel grooves 3, and the inner side of the second section 2 is also formed with a plurality of elongated at least substantially parallel recesses in the form of grooves 5. FIG. 1 merely shows three parallel grooves 3 and three parallel grooves 5 each of which is aligned with one of the grooves 3. The grooves 3 and 5 can removably receive the respective marginal portions of elongated partitions 4 (one shown in FIG. 2) which serve to divide the internal chamber 63 of the housing of the dark box M into a number of variable-capacity compartments 64 (two shown in FIG. 2). The partitions 4 can be transferred from first selected pairs into second selected pairs of aligned grooves 3, 5 in order to change the capacities of the neighboring compartments 64 in dependency on the formats of sheets 60, 60a . . . which are to be temporarily confined therein.

The partitions 4 constitute one set of parts for dividing the internal chamber 63 into compartments 64 of selected capacities. Such dividing means further comprises one or more walls 7 (only one shown in FIGS. 1 and 2) which are movable longitudinally of the adjacent grooves in order to select the effective length of the respective compartments 64. FIG. 1 and 2 show that the wall or walls 7 are installed in the first section 1 of the housing; each such wall is movable longitudinally of an elongated guide rail 6 between a pair of neighboring grooves 3, and each wall 7 can be separably secured to the first section 1 by at least one screw 8 or another suitable fastener. If the inner sides of the housing sections 1 and 2 are provided with only three grooves (3, 5) each, the internal chamber 63 can be subdivided into four compartments 64 which may but need not have identical widths (depending on the distribution of grooves 3 and of the aligned grooves 5) and the length of each of which is preferably variable by a discrete mobile wall 7. The depth of each compartment 64 is or can be such that each of these compartments can receive a pile or stack 61 of two, three or more superimposed sheets 60, 60a . . . having a particular format.

If the dark box M of FIGS. 1 and 2 is to store larger sheets, one or more or all partitions 4 are removed and/or shifted into different grooves 3 and/or 5, and the walls 7 are moved out of the way or shifted along the respective guide rails 6 to different positions to permit the establishment of one or more compartments 64 having a desired size (length and width) for one or more selected formats of flexible light sensitive sheets 60. For example, all of the partitions 4 can be removed to provide a single compartment 64 whose size matches or is less than that of the internal chamber 63, depending upon whether the wall or walls 7 are used to limit the length of the single compartment as seen in the longitudinal direction of the grooves 3 and 5. It is equally possible to distribute the parts 4 and 7 of the adjustable dividing means in such a way that the housing including the sections 1, 2 defines two, three or five or more compartments 64, depending on the formats of sheets 60 to be temporarily confined therein.

FIG. 2 shows that the head of the illustrated fastener 8 is spaced apart from the adjacent portion of the inner side of the second or top housing section 2 when the latter is caused to assume the closed or sealing position. In order to prevent the topmost sheet or sheets 60 in the adjacent compartments 64 from migrating along the inner side of the section 2 over the head of the illustrated fastener 8, the section 2 preferably supports a set of substantially U-shaped hold down devices 10 which can bear against the topmost sheets 60 in the adjacent compartments 64 to thus prevent any undesirable shifting of confined sheets when the section 2 has been pivoted to the closed or sealing position of FIG. 2. The provision of hold down devices 10 is particularly desirable when the sheets 60 in the neighboring compartments 64 are relatively small and/or when the closed dark box M is treated by inexperienced persons. The hold down devices 10 can be biased toward the inner side of the housing section 1 by suitable springs (not shown) to even further reduce the likelihood of uncontrolled shifting of confined sheets over the heads of the fasteners 8.

The second housing section 2 is provided with an opening 65 (indicated in FIG. 1 by broken lines) which can be closed and sealed by a substantially panel-like member or door 9 which is slidable in suitable ways (not specifically shown) of the section 2 between a first position in which the opening 65 is exposed and a second position in which the opening 65 is closed and sealed against penetration of radiation which could affect the quality of latent images on the sheets in their compartments 64. The aforementioned hold down devices 10 are or can be provided on the sealing-exposing member 9.

The opening 65 establishes one of two available paths for introduction of sheets into or for withdrawal of sheets from their respective compartments 64. The other path is established by the opening which develops when the second housing section 2 is pivoted from the closed position of FIG. 2 to the open position of FIG. 1.

The first housing section 1 is further provided with several (FIG. 1 shows four) circular depressions or sockets 11 which extend from the inner side toward but short of the outer side of the section 1 and each of which communicates with a slit-shaped passage 12 extending all the way to the outer side of the section 1. The purpose of the depressions 11 and of the associated slit-shaped passages 12 is to permit suction cups 25 (FIGS. 3a, 3b, 3c) or analogous sheet lifting devices of the sheet attracting, extracting, transferring and returning apparatus to draw atmospheric air when the adjacent portions of the respective compartments 64 do not contain any sheets. Thus, the depressions 11 and the passages 12 can be said to constitute component parts of means for monitoring the dark box M for the presence of sheets in the compartments 64. The suction cups 25 can extend all the way into the respective depressions 11 so that they draw air only from the atmosphere (through the respective passages 12 which, as already mentioned above, extend all the way to the outer side of the housing section 1). The pressure in the suction cups 25 is ascertained by a pressure sensing unit which is installed in or is associated with an evaluating or control unit 35 (FIGS. 3a and 3b) of the monitoring means forming part of the sheet attracting, flexing, extracting, transferring and returning apparatus.

Figure 3A:
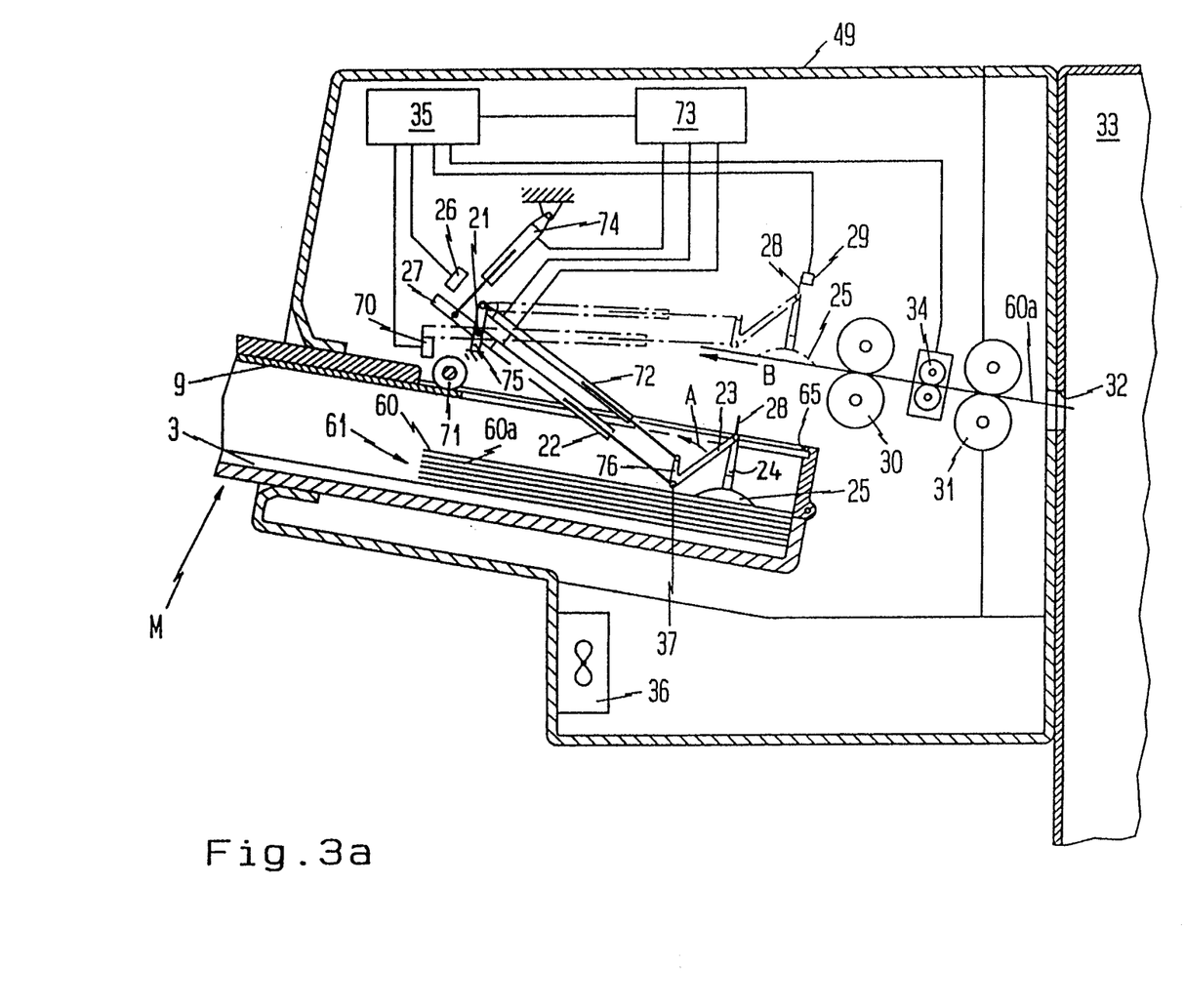
FIG. 3a is a schematic partly elevational and partly sectional view of an apparatus which is utilized to transfer sheets of different formats from a dark box into one or more developing machines.
Figure 3B:
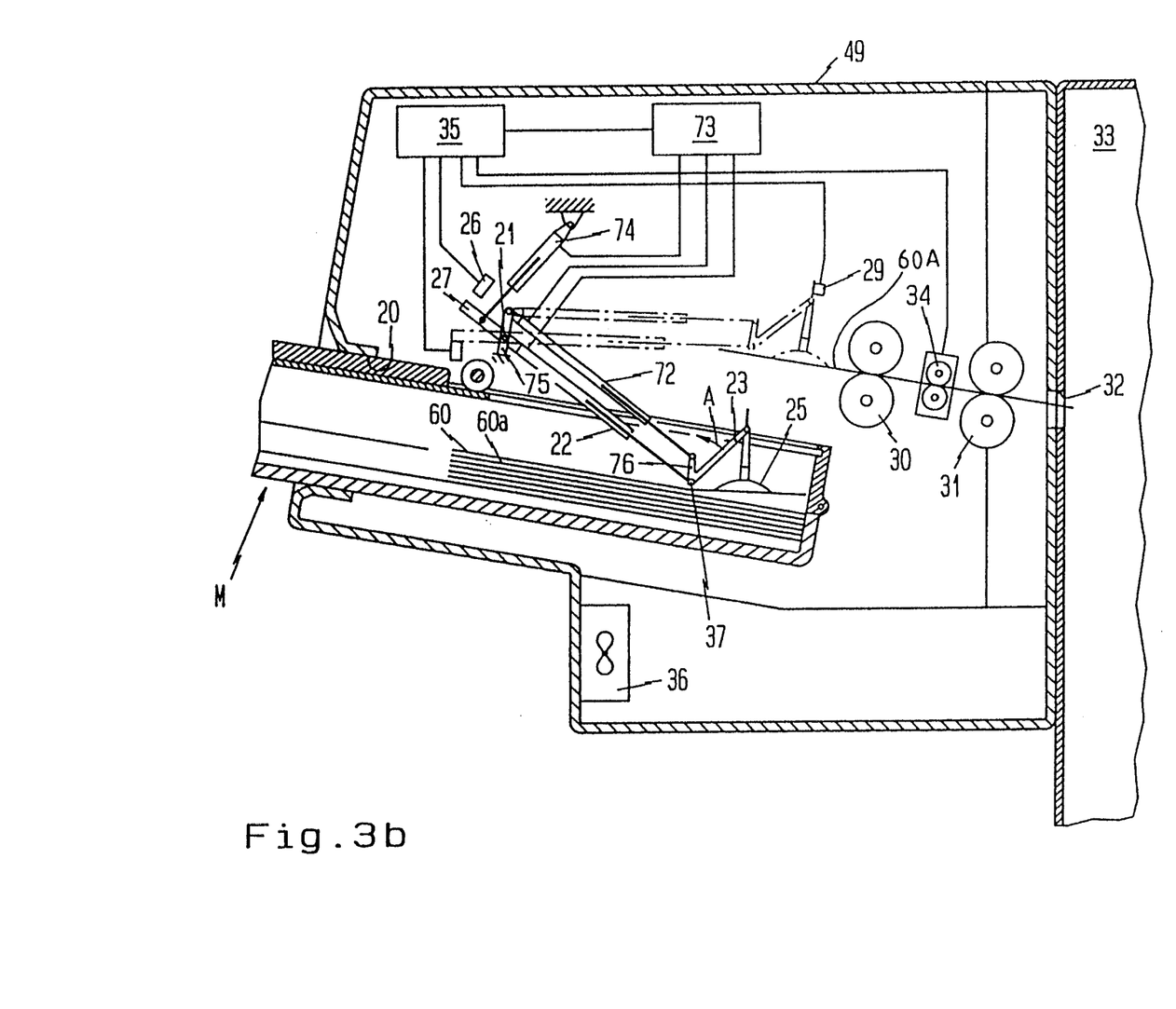
FIG. 3b shows the structure of FIG. 3a but with the suction cups in different angular positions.

The sections 1 and 2 of the housing of the dark box M are further provided with discrete U-shaped handles 13 and 14, respectively. Each of these handles carries two independently operable locking or closing elements 15, 16. The locking elements 15, 16 of the handle 13 can cooperate with similarly referenced locking elements of the handle 14 to maintain the second housing section 2 in the closed position of FIG. 2. This reduces the likelihood of accidental opening of the dark box M, e.g., during introduction into a darkroom or enclosure 49 which is shown in FIGS. 3a and 3b and forms part of the aforementioned sheet manipulating apparatus. The housing sections 1 and 2 can be made of any suitable material which prevents penetration of radiation into the chamber 63 when the section 2 is maintained in the closed position of FIG. 2 and the slidable exposing-sealing member 9 is maintained in the operative position of FIG. 1.

FIG. 2 shows that the housing sections 1 and 2 comprise sealing portions 1a, 2a which cooperate to prevent the penetration of radiation into the chamber 63 when the section 2 is maintained in the closed position.

An important advantage of the improved dark box M is that it can be rapidly converted for storage of a single stack 61, for storage of two stacks having sheets of identical size and shape or differently dimensioned and/or configured sheets, or for storage of three or more stacks of identical or different sheets. Thus, if all of the partitions 4 are removed and the walls 7 are pushed out of the way or removed, the internal chamber 63 of the dark box M is ready to receive a single stack 61 of relatively large sheets 60. If a single partition is placed midway between the sidewalls of the housing sections 1, 2, the internal chamber 63 is divided into two equal compartments 64 each of which can receive a stack 61 of sheets 60. Other simple manipulations of the partition or partitions 4 and/or walls 7 will be carried out in order to provide three or more compartments 64 of desired size and shape.

The provision of grooves 3 in the inner side of the housing section 1 or the provision of grooves 5 in the inner side of the housing section 2 is optional, i.e., each partition 4 which is put to use to subdivide the chamber 63 can extend into a single groove 5 or into a single groove 3. The provision of grooves 3, 5 in each of the two housing sections 1, 2 is preferred at this time because, if a partition extends into a pair of aligned grooves 3 and 5, it is more likely to establish a combined light barrier and sheet-confining barrier all the way between two neighboring compartments 64.

The dimensions of the housing section 2 may but need not match the dimensions of the housing section 1. Furthermore, the hinge 62 can be replaced with other suitable means for movably coupling the sections 1 and 2 to each other. A hinge 62 is preferred at this time because it enables the person in charge to move the section 1 or 2 to the fully open position of FIG. 1 and to thus facilitate introduction of stacks 61 of sheets 60 into the compartment or compartments of the dark box M. The opening which develops in response to opening of the dark box M in a manner as shown in FIG. 1 can also serve for evacuation of sheets 60 from their compartment or compartments 64; however, it is normally preferred to provide the aforediscussed panel-like slidable member 9 which can seal the opening 65, i.e., to provide a separate opening for withdrawal of sheets 60. This ensures that the dark box M need not be fully opened upon introduction into the opening 20 of the enclosure 49 in the manipulating apparatus of FIGS. 3a and 3b. Moreover, it is simpler to automatically shift the member 9 to the open position, particularly in response to introduction of a certain portion of the closed dark box M into the inlet opening 20 of the enclosure 49.

The darkroom or enclosure 49 of the sheet manipulating apparatus which is shown in FIGS. 3a and 3b has the aforementioned inlet opening 20 for introduction of an at least partially filled dark box M. This apparatus further comprises means (such as a rubber-coated friction wheel or roller 71 of FIGS. 3a and 3b) for automatically moving the slidable closing-exposing member or door 9 to the open position in response to insertion of a certain portion of the dark box M into the internal space of the enclosure 49. Reference may be had to U.S. Pat. No. 4,049,142 granted Sep. 20, 1977 to Azzaroni. The roller 71 automatically shifts the cover 9 to open position in response to introduction of the dark box M into the opening 20. The means for simultaneously withdrawing two or more sheets 60 from the respective compartments 64 of the dark box M whose housing has been partially introduced into the enclosure 49 through the inlet opening 20 includes a linkage for the battery of (e.g., four) pneumatic lifting devices in the form of suction cups 25. Such linkage includes two elongated members 22 (e.g., pneumatic cylinder and piston units—see particularly FIG. 3c which are pivotable about the horizontal axes of shafts 21 and each of which is preferably of variable length. Each of the illustrated members or units 22 comprises a plurality of portions which are telescoped into each other so that they can select the distance of the suction cups 25 from the shafts 21. Each member or unit 22 carries at its free end (namely the end which is distant from the respective shaft 21) a lever 23 which is pivotable in and counter to the direction indicated by arrow A. One end of each lever 23 is articulately connected to the respective member or unit 22, and the other ends of these levers carry a rod-like support 24 for the battery of suction cups 25. As concerns the movements of suction cups 25 relative to the adjacent sheets 60, reference may be had again to U.S. Pat. No. 4,049,142 to Azzaroni as well as to commonly owned U.S. Pat. No. 4,591,140 granted May 27, 1986 to Illig et al. The means for raising and lowering the suction cups 25 includes pneumatic cylinder and piston units 74. The means for preventing the suction cups 25 from changing their orientation during movement between the solid-line and phantom-line positions of FIGS. 3a and 3b comprises a parallel motion mechanism including the rod-shaped members or units 22, cylinder and piston units 72, rigidly mounted connecting members 75 and the arms 76 of the levers 23. Thus, the undersides of the suction cups 25 are normally parallel to the sheets 60 in the respective compartments 64. The cylinder and piston units 72 serve to change the orientation of the suction cups 25 (compare the solid-line positions of the suction cup 25 which is shown in FIGS. 3a and 3b) in order to enhance separation of the respective topmost sheet 60 from the sheet 60a therebelow.

The means for monitoring the withdrawal of sheets 60 from the respective compartments 64 and the advancement of withdrawn sheets toward the inlet 32 of the illustrated single developing machine 33 (i.e., toward the outlet of the enclosure 49) comprises a trip 27 which is provided on at least one of the members 22 and can actuate a microswitch 26 serving to transmit signals to the control unit 35 of the monitoring means. Furthermore, at least one suction cup 25 carries an extension or trip 28 which also forms part of the monitoring means and can actuate a microswitch 29 serving to transmit signals to the control unit 35.

The means for conveying freshly withdrawn sheets 60 from the suction cups 25 toward and into the inlet 32 of the developing machine 33 comprises several pairs of advancing rolls (FIGS. 3a and 3b show two pairs 30, 31) which define an elongated path extending from the suction cups 25 (when these suction cups assume the phantom-line positions of FIGS. 3a and 3b) to the inlet 32.

Figure 5:
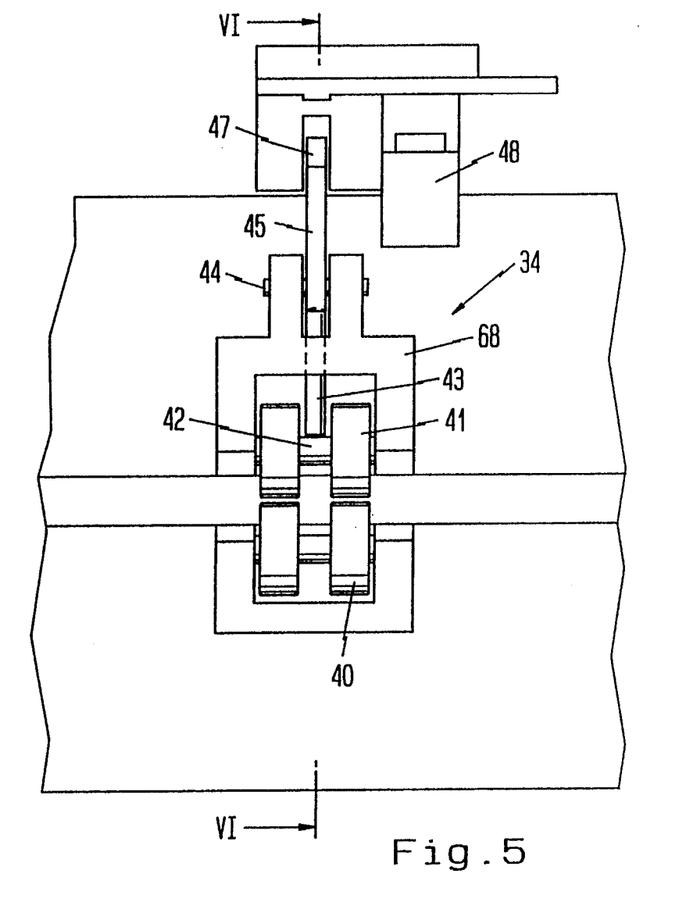
FIG. 5 is a front elevational view of certain component parts of means for monitoring the numbers of withdrawn sheets in the apparatus of FIGS. 3a-3c or FIG. 4.
Figure 6:
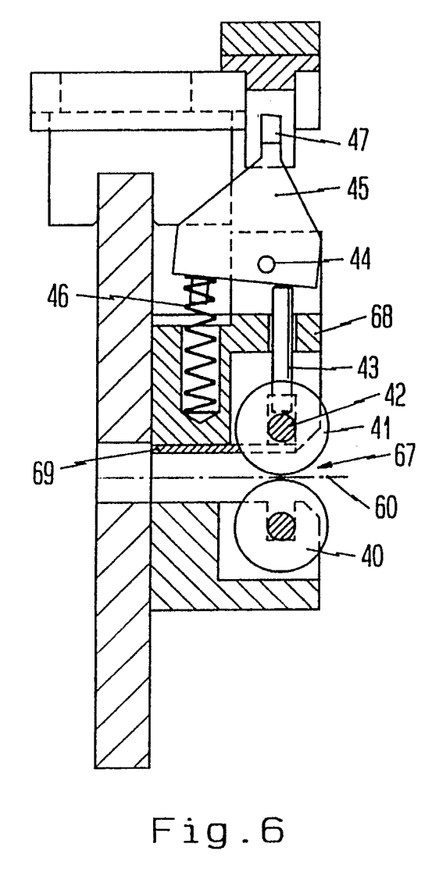
FIG. 6 is a sectional view substantially as seen in the direction of arrows from the line VI—VI in FIG. 5.

The monitoring means of the apparatus which is shown in FIGS. 3a and 3b further comprises means 34 for ascertaining or counting the number of overlapping or partly overlapping sheets 60 which are being advanced along the aforementioned path toward and into the inlet 32 of the developing machine 33. The details of presently preferred ascertaining or counting means 34 are shown in FIGS. 5 and 6. One such ascertaining or counting means 34 is or can be provided for each suction cup 25.

Referring now to FIGS. 5 and 6, the ascertaining or counting means 34 which is shown therein comprises two pairs of rollers 40, 41 or analogous rotary members which define a nip 67 for sheets 60A, 60, 60a . . . , namely for those sheets which advance along the path defined by the pairs of advancing rolls 30 and 31. The rollers 40, 41 are disposed at opposite sides of the path for the sheets, and the rollers 40 of the lower pair are idler rollers which are rotatable about a fixed common horizontal axis. The upper rollers 41 are rotatable about a horizontal shaft 42 which is journalled in a mobile frame 68, and the latter is biased against a stop 69 by one or more coil springs 46 so that the rollers 41 tend to reduce the width of the nip 67 to a minimum value, e.g., zero.

The spring 46 which is shown in FIG. 6 further serves to bias a lever 45 in a clockwise direction so that the shorter arm of this lever bears against a pin 43 which is reciprocably mounted in the frame 68 and shares the movements of the rollers 41 toward and away from the rollers 40. The longer arm 47 of the lever 45 (which is fulcrumed at 44) cooperates with a photoelectronic scanning device 48 (e.g., a standard light barrier of the type known as TLP 1019 distributed by Toshiba) which transmits to the control unit 35 signals denoting the level of the rollers 41, i.e., the number of overlapping or partly overlapping sheets 60, 60a . . . in the nip 67. FIG. 6 shows the rollers 41 in their optimal positions, i.e., the number of sheets 60 in the nip 67 is one.

Figure 3C:
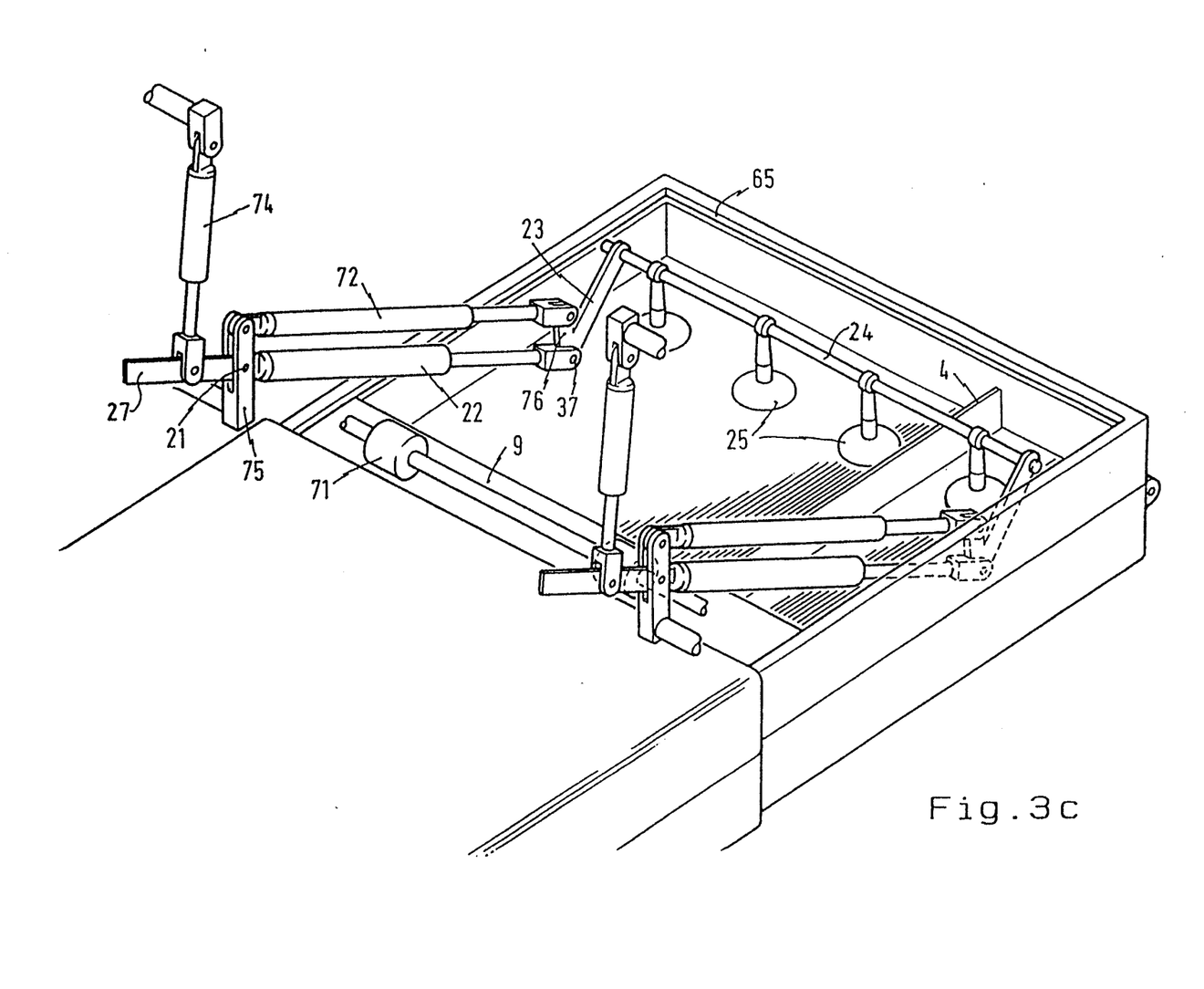

The operation of the apparatus which is shown in FIGS. 3a, 3b and 3c and embodies the structure of FIGS. 5 and 6 is as follows:

When the dark box M is properly inserted into the inlet opening 20 of the enclosure 49, the member 9 is automatically shifted to the open position by the roller 71 so that it exposes the opening 65 which affords access to the compartments 64 of the internal chamber 63. Movement of the exposing-sealing member 9 to open position can also be initiated by a signal from the control unit 35 which, in turn, receives a signal from a suitable sensor (not specifically shown) serving to detect a properly inserted dark box M in the inlet opening 20. A signal from the control unit 35 thereupon causes the units 74 to initiate a pivotal movement of members 22 about the axes of the respective shafts 21 and, if necessary, a pivotal movement of levers 23 at 37 so that the suction cups 25 leave the phantom-line positions of FIGS. 3a and 3b and descend into the dark box M to (solid-line) positions of registry with the respective depressions 11 in the inner side of the housing section 1. The aforementioned parallel motion mechanism 22, 72, 75, 76 ensures that the orientation of suction cups 25 remains unchanged during descent into the dark box M. The next step involves pivoting of the suction cups 25 from the solid-line positions of FIG. 3a to the solid-line positions of FIG. 3b in order to reliably separate the topmost sheets 60 from the neighboring sheets 60a. This involves actuation of the units 72 which cause the suction cups 25 to pivot at 37. The units 74 are thereupon actuated again until the trips 27 reach and actuate one or more switches 70. This takes place when the thus lifted sheets 60 can be taken over by the rollers 30. The character 73 denotes in FIGS. 3a and 3b a pneumatic regulator which initiates and controls the operation of the units 22, 72, 74 (i.e., the movements of the suction cups 25) in response to signals from the control unit 35. Each suction cup 25 carries a microswitch (reference may be had to commonly owned U.S. Pat. No. 4,759,679 granted Jul. 26, 1988 to Müller) which is actuated by the uppermost sheet 60 in the respective compartment 64. Downward movement of the suction cups 25 is terminated when at least one of the just mentioned microswitches is actuated by the adjacent sheet 60. The control unit 35 then connects the suction cups 25 with a pump or with another suitable suction generating device (not shown) so that the suction cups begin to attract the adjacent uppermost sheets 60 (or at least one of these suction cups attracts the uppermost sheet 60 of the respective stack 61).

As already described above, the control unit 35 thereupon transmits a signal which causes the levers 23 to pivot about the axis of the member 37 in the direction of arrow A so that the attracted uppermost sheet or sheets 60 are at least partially extracted from the dark box M through the opening 65, and the control unit 35 thereupon transmits one or more additional signals which cause the linkage including the members 22 to manipulate the levers 23 in such a way that the leader(s) of the at least partially extracted sheet(s) 60 enters or enter the nip of the first pair of rolls 30 of the means for conveying sheets (one shown at 60A) from the suction cups 25 into the inlet 32 of the developing machine 33, i.e., toward the outlet of the enclosure 49. The developing machine 33 can be of the type known as STRUC-TURIX NDTM which is distributed by the assignee of the present application.

The just described withdrawal of one or more uppermost sheets 60 involves slight flexing of the leaders of such uppermost sheets by the units 72, and this almost invariably results in separation of the flexed uppermost sheet or sheets from the sheet or sheets 60a immediately below. Introduction of the leaders of withdrawn uppermost sheets 60 into the nip of the rolls 30 can also involve a change of the length of members or units 22. FIGS. 3a and 3b show a suction cup 25 once in a phantom-line position and once by solid lines. When in the solid-line positions, the suction cups 25 are adjacent the stacks 61 of sheets 60, 60a . . . in the respective compartments 64 of the internal chamber 63 which is defined by the sections 1, 2 of the housing forming part of the dark box M. When in the phantom-line positions, the suction cups 25 are in the process of introducing the leaders of simultaneously withdrawn uppermost sheets 60 into the nip of the advancing rolls 30. FIGS. 3a and 3b further show that the effective length of the members 22 in phantom-line positions exceeds the effective length of these members in the solid-line positions.

The control unit 35 has several inputs which transmit to its signal evaluating and processing circuit a number of different signals. Thus, the control unit 35 receives signals when the suction cups 25 assume the solid-line positions of FIG. 3 and when the suction cups are thereupon connected with a suitable suction generating device. A subatmospheric pressure will develop in a suction cup 25 only if the respective compartment 64 contains at least one sheet 60 and if the suction cup is sufficiently close to such at least one sheet to prevent the inflow of air from the surrounding atmosphere above the at least one sheet. Since the height of each stack or pile 61 of sheets 60 can vary and often varies from compartment to compartment, it can happen that a first lowering of suction cups 25 from the phantom-line positions to the solid-line positions of FIGS. 3a and 3b results in the establishment of vacuum in a single suction cup or in fewer than all four suction cups. This means that the first lifting of suction cups 25 from the solid-line positions to the phantom-line positions of FIG. 3 will result in withdrawal of one, two or three sheets 60 (rather than four sheets, it being assumed here that the internal chamber 63 of the housing of the dark box M which is shown in FIGS. 3a and 3b is divided into four compartments 64 and that each such compartment contains a stack 61 of exposed but undeveloped sheets 60). The same procedure is repeated again and again, as often as necessary, until the height of all four stacks 61 is at least nearly the same. From then on, each of the four suction cups 25 lifts the uppermost sheet 60 off the respective stack 61 (i.e., from the respective compartment 64) during each movement from the solid-line position to the phantom-line position of FIG. 3.

The aforementioned microswitches which are associated with the suction cups 25 transmit to the control unit 35 signals which denote whether or not the respective suction cups have developed a vacuum upon movement to the solid-line position of FIGS. 3a and 3b. Thus, the control unit 35 can ascertain which of the suction cups 25 is about to lift a sheet 60, and the control unit 35 can transmit an advance signal to the respective ascertaining or counting device 34 of the monitoring means. For example, if the height of all four stacks 61 is the same from the very start of operation of the sheet manipulating apparatus of FIGS. 3a, 3b, 3c or after a certain number of cycles which are performed by the suction cups 25, each of the four ascertaining or counting devices 34 receives an advance signal that a sheet 60 is about to reach the nip 67 of its rotary members 40, 41. This causes the longer arms 47 of the respective levers 45 to move into the paths of radiation which is emitted by the radiation sources of the respective photoelectronic scanning devices 48. The control unit 35 receives an "error" or "defect" or "malfunction" signal if a suction cup 25 is under vacuum but the corresponding ascertaining device 34 fails to receive a sheet 60 after elapse of a certain interval of time thereafter. The detection of such "defect" signal induces the control unit 35 to start the motor or motors for the rolls 30 in reverse so that the respective sheet 60 is advanced backwards (arrow B in FIG. 3a) and is returned into the respective compartment 64. The next step involves renewed advancement of the retracted sheet 60 in the direction toward the inlet 32 of the developing machine 33.

If the arm 47 of a particular lever 45 interrupts the radiation beam for the associated photoelectronic device 48 for a short interval of time, this indicates to the control unit 35 that the respective nip 67 contains at least two superimposed or overlapping sheets 60, 60a . . . because the pin 43 of the respective ascertaining means 34 has been advanced beyond that position or beyond that level which is indicative of the presence of a single sheet 60 in the respective nip 67. In other words, the respective suction cup 25 has withdrawn two or more sheets 60, 60a . . . from the respective stack 61 in a single stage of its operation (movement from the solid-line position to the phantom-line position of FIG. 3a or 3b). This, too, induces the control unit 35 to reverse the direction of rotation of the rolls 30 in order to return the sheets 60 into the respective compartments 64, and to thereupon again drive the rolls 30 in a direction to advance sheets 60 toward the inlet 32 of the developing machine 33. Furthermore, and particularly if the control unit 35 receives a certain number of "defect" signals which denote that one or more suction cups 25 have lifted two or more sheets 60, 60a . . . in a single withdrawing step, the control unit 35 can slow down the withdrawing operation or it can slow down one or more selected stages of the withdrawing operation in order to provide more time for separation of (flexed) topmost sheets 60 from the sheets 60a immediately below them. The arrangement is such that the control unit 35 prolongs the intervals of time following pivoting of the levers 23 in directions which are indicated by the arrow A in FIGS. 3a and 3b before the members 22 are pivoted at 21 to lift the suction cups 25 to their phantom-line positions.

Alternatively or in addition, and assuming that one or more suction cups 25 exhibit a tendency to simultaneously lift two or more overlapping sheets 60, 60a . . . , the control unit 35 can cause the units 72 to change the extent of pivotal movement of the levers 23 in the direction of arrow A, i.e., to alter (preferably increase) the extent of flexing of the topmost sheets 60 which is also conducive to more reliable separation of topmost sheets- from the sheets immediately below them. In accordance with a presently preferred embodiment, the control unit 35 doubles the length of intervals of time which elapse following pivoting of the levers 23 in the direction of arrow A and preceding pivoting of the members 22 in a counterclockwise direction (as viewed in FIGS. 3a and 3b). Thus, if the control unit 35 receives a signal that at least one of the suction cups 25 has lifted two or more sheets 60, 60a . . . , this control unit simply increases by 100 percent or approximately 100 percent the interval of time which elapses between pivoting of the levers 23 in the direction of arrow A and pivoting of the members 22 in a counterclockwise direction. This has been found to enormously increase the likelihood of extraction of discrete uppermost sheets 60 (without the neighboring sheets 60a). Withdrawal of a particular sheet 60 (which has been withdrawn jointly with one or more sheets 60a . . . below it) can be repeated a certain number of times (e.g., three times) so that the fourth attempt involves the retention of the leaders of uppermost sheets 60 in upwardly flexed condition for an interval of time which is four times the original interval. This has been found to practically invariably ensure withdrawal of a single sheet 60 at a time by each of the suction cups 25. If the above outlined undertakings still fail to result in proper separation of uppermost sheets 60 from the sheets 60a immediately below them, the control unit 35 is preferably designed to generate an acoustic, optical and/or other readily detectable signal which informs an attendant that she or he must gain access to the internal space of the enclosure 49 in order to pivot the housing section 2 to the open position and to manually separate the uppermost sheet 60 from the immediately following sheet 60a of each stack 61 or of that stack wherein the leaders of sheets tend to adhere to each other. This can take place when one or more sheets are damaged (e.g., torn) and are interlaced with the neighboring sheets.

When a suction cup 25 detects an empty compartment 64 or when the withdrawal of the last or lowermost sheet of a stack 61 in a particular compartment 64 is completed, such suction cup is free to descend into the respective depression or socket 11 and to draw atmospheric air through the respective passage 12. Thus, the pressure in such suction cup 25 does not drop when the suction cup is connected to the aforementioned suction generating means. When the same situation develops in connection with each and every suction cup 25, the control unit 35 generates a signal which causes closing of the exposing-sealing member 9 and ejection of the dark box M from the enclosure 49 via inlet opening 20. Alternatively, the control unit 35 can generate a signal which informs an attendant that the emptied dark box M can be withdrawn by hand.

However, and since the establishment of sub-atmospheric pressure in a given suction cup 25 can also take place for reasons other than exhaustion of the supply of sheets 60 in a particular compartment 64, the trips 27 of the members 22 are preferably dimensioned and positioned to actuate the respective switches 26 when all of the suction cups 25 have descended into the respective depressions 11 so that the control unit 35 again receives a signal which indicates that the dark box M which extends into the inlet opening 20 of the enclosure 49 is empty and is thus ready to be replaced with a dark box which contains one or more stacks 61 of sheets 60.

The purpose of the microswitch or microswitches 29 is to transmit signals which indicate to the control unit 35 that the suction cups 25 should be disconnected from the suction generating means (such as the aforementioned pump). The extension or extensions 28 of one or more suction cups 25 will engage the adjacent microswitch or microswitches 29 when the leaders of the withdrawn sheets 60 are located in the nip of the rolls 30 so that they can be reliably conveyed or advanced toward the inlet 32 of the developing machine 33.

The microswitch(es) 26 and/or 29 can be replaced with optoelectronic sensor means or with other suitable signal generating and transmitting means without departing from the spirit of the invention.

The internal space of the enclosure 49 preferably accommodates one or more blowers 36 or other suitable means for raising the pressure in the internal space slightly above atmospheric pressure or above the pressure in the developing machine 33. This ensures that vapors of developing solution cannot penetrate from the machine 33 into the enclosure 49 and thus cannot affect the quality of latent images on the sheets 60 which are still confined in the dark box M or are in the process of being withdrawn from the dark box to be transported toward and into the inlet 32. Furthermore, vapors which develop in the machine 33 could bring about rapid corrosion of metallic parts in the internal space of the enclosure 49.

An advantage of the apparatus which is shown in FIGS. 3a, 3b and 3c is that it can simultaneously withdraw two or more sheets from a dark box M in the inlet opening 20. This renders it possible to empty the contents of a dark box within a fraction of the time which is required by conventional feeders. The developing machine 33 can be of standard design which is capable of processing larger and smaller exposed sheets and which is equally capable of simultaneously developing two or more sheets having identical or different formats.

The monitoring means of the apparatus of FIGS. 3a, 3b and 3c can be replaced with simpler or more complex monitoring means without departing from the spirit of the invention. As a rule, it suffices to provide monitoring means whose constituents can perform the aforediscussed functions of ascertaining the presence or absence of stacks 61 and sheets 60 in the respective compartments 64 (by ascertaining the pressure in the suction cups 25), of ascertaining the number of sheets which are withdrawn by a suction cup 25 during movement from the solid-line position to the phantom-line position of FIG. 3a or 3b, and by repeating the introduction of a sheet which is the uppermost one of two or more superimposed sheets in the nip of the rolls 30.

The levers 45 of the ascertaining or counting devices 34 can be replaced with other means for actuating the respective optoelectronic devices 48. The arrangement which is shown in FIGS. 5 and 6 is preferred at this time because it is capable of ensuring that the extent of movement of the longer arm 47 relative to the optoelectronic device 48 greatly exceeds the extent of upward movement of the rotary members 41 when the nip 67 receives two or more overlapping sheets 60, 60a . . . This enhances the reliability of the ascertaining means 34. Such ascertaining means can detect the absence of a sheet 60 in the nip 67, the presence of a single sheet 60 in the nip, or the presence of two or more sheets 60, 60a . . . in the nip.

Figure 4:
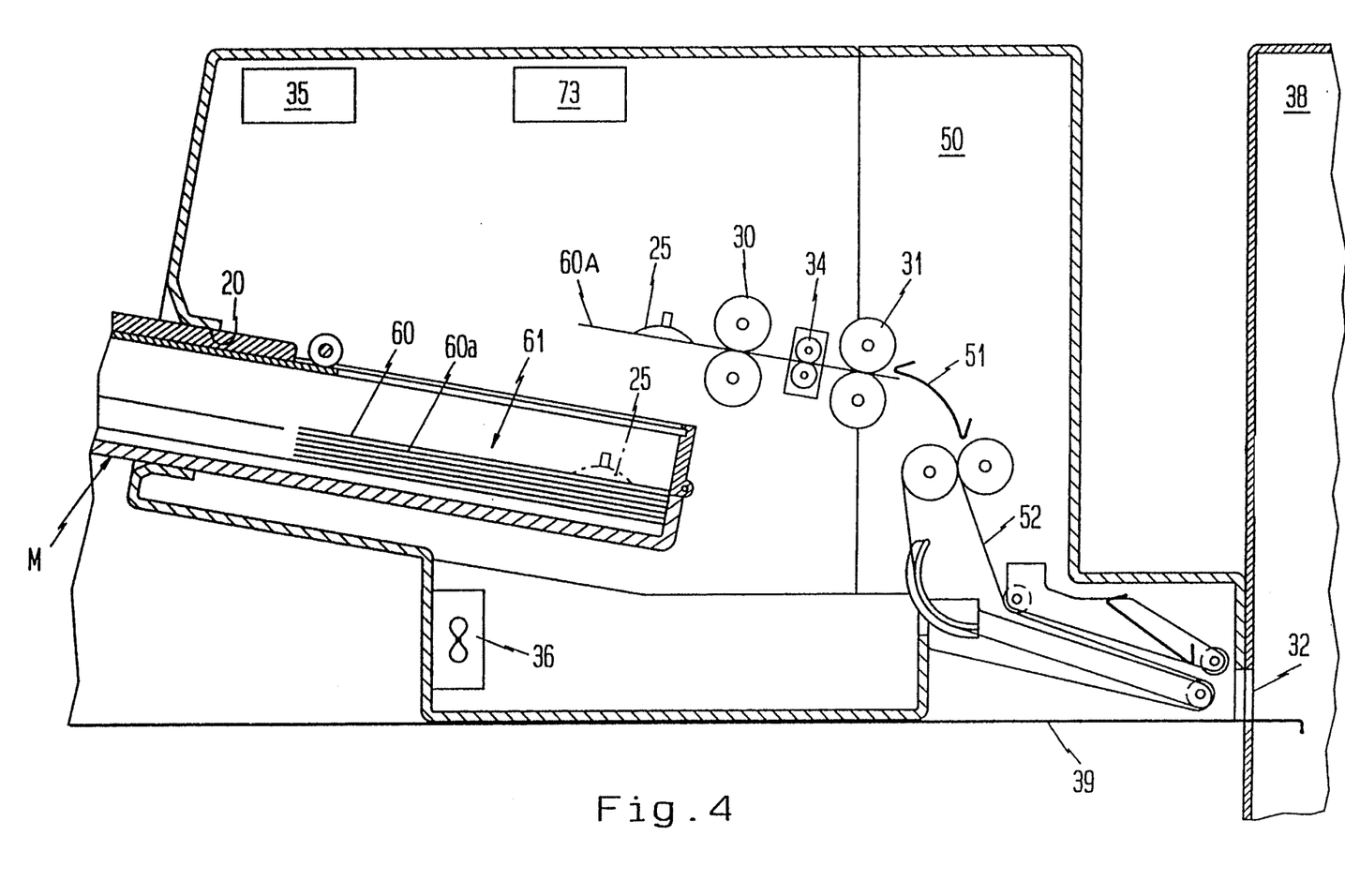
FIG. 4 is a similar partly elevational and partly sectional view of a modified apparatus which is provided with means for arraying simultaneously withdrawn sheets prior to introduction into a developing machine.

The developing machine 33 of FIGS. 3a and 3b is assumed to be capable of simultaneously processing four discrete sheets 60, i.e., the inlet 32 is long enough (as seen at right angles to the plane of FIG. 3a or 3b) to permit simultaneous passage of a number of sheets 60 (namely one sheet for each suction cup 25 except, of course, if the apparatus of FIGS. 3a and 3b is designed to employ more than one suction cup per sheet). FIG. 4 shows a modified transferring apparatus which is provided with a converting unit 50 downstream of the conveying or advancing means including the pairs of rolls 30 and 31. The unit 50 is designed to deliver simultaneously withdrawn sheets 60 into the inlet 32 of a modified developing machine 38, e.g., a machine known as STRUCTURIX NDTE which is distributed by the assignee of the present application. The machine 38 is operated in a dark chamber and includes a platform 39 immediately beneath the inlet 32. Heretofore, sheets 60 were manually fed into the inlet 32 of the machine 38 by sliding them along the platform 39. The adapter 50 automatically transfers sheets 60 from the path defined by the rollers 30, 31 onto the platform 39. The converting unit or adapter 50 comprises an arcuate deflector 51 which is located downstream of the rolls 31 and deflects sheets 60 coming from the nip of the rolls 31 onto an endless belt or chain conveyor 52 which advances the sheets onto the platform 39.

All other parts of the apparatus which is shown in FIG. 4 are or can be identical with or similar to corresponding parts of the apparatus of FIGS. 3a, 3b and 3c.

The adapter 50 enables a machine (38) of earlier vintage to receive sheets 60 from an apparatus of the type described with reference to FIGS. 3a, 3b and 3c, namely an apparatus which can simultaneously withdraw two or more identical or different sheets from a dark box M or an analogous cassette or magazine for exposed but undeveloped photosensitive material.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art and, therefore, such adaptations should and are intended to be comprehended within the meaning and range of equivalence of the appended claims.

What is claimed is:

1. A dark box comprising:
   a housing defining an internal chamber and having at least one opening for insertion and withdrawal of a plurality of sheets of different formats;
   means for sealing and exposing said at least one opening;
   adjustable means for dividing said chamber into a plurality of variable-capacity compartments for said sheets of different formats each of said plurality of compartments being adjacent to and spaced from another of said plurality of compartments;
   means for storing said sheets of different formats in said plurality of compartments; and
   means for simultaneous dispensing of at least two of said stored sheets from at least two of said compartments to at least one developing machine.

2. The dark box of claim 1, wherein the compartments of said plurality of variable-capacity compartments include at least two compartments which are adjacent each other.

3. The dark box of claim 1, wherein said housing has at least one recess and said adjustable means includes at least one partition having a portion insertable into and withdrawable from said at least one recess.

4. The dark box of claim 3, wherein said housing includes a first section and a second section movable relative to said first section between an open and a closed position, said at least one recess being provided in one of said sections.

5. The dark box of claim 4, wherein said one of said sections has an inner side and an outer side, said housing having at least two recesses constituting substantially parallel elongated grooves in the inner side of said one of said sections.

6. The dark box of claim 5, wherein said means for adjusting further comprises at least one wall which is movable in said chamber substantially longitudinally of said grooves, and means for releasably securing said at least one wall to said housing in a selected position as seen longitudinally of said grooves.

7. The dark box of claim 1, wherein said means for adjusting comprises at least one mobile wall disposed in said chamber and means for releasably securing said at least one wall to said housing in any one of a plurality of different positions in each of which the capacity of at least one of said compartments assumes a different value.

8. The dark box of claim 1, wherein said housing includes a first section, a second section and means for pivotably coupling said second section to said first section, said at least one opening being provided in said second section and said means for sealing and exposing being provided on and being movable relative to said second section.

9. The dark box of claim 8, wherein said sealing and exposing means includes a panel-shaped member which is slidable relative to said second section.

10. The dark box of claim 1, wherein said housing comprises a first section and a second section, said second section being movable relative to said first section between open and closed positions and said first and second sections having inner sides which confront each other in the closed position of said second section, each of said inner sides having at least one elongated groove and said at least one groove of said first section being aligned with said at least one groove of said second section in the closed position of said second section, said adjustable means comprising at least one partition having portions received in said grooves in the closed position of said second section.

11. The dark box of claim 1, wherein each of said plurality of variable-capacity compartments has a depth which is sufficient to accommodate a stack of superimposed sheets.

* * * * *